United States Patent [19]

Smith

[11] Patent Number: 4,821,919
[45] Date of Patent: Apr. 18, 1989

[54] APPARATUS FOR STACKING CONICAL OBJECTS

[75] Inventor: Alan Smith, Accrington, England

[73] Assignee: Hollingsworth (UK) Ltd., Accrington, England

[21] Appl. No.: 39,146

[22] Filed: Apr. 16, 1987

[30] Foreign Application Priority Data

May 23, 1986 [GB] United Kingdom ............... 8612636

[51] Int. Cl.⁴ .................... B65G 59/06; B65G 11/20
[52] U.S. Cl. ............................. 221/131; 221/6;
221/129; 221/251; 221/258; 221/298; 221/301;
312/35; 211/59.2; 211/59.4; 414/788.2;
414/798
[58] Field of Search ............... 221/67, 6, 112, 114,
221/115, 116, 118, 123, 124, 129, 131, 200, 204,
251, 258, 298, 301, 193, 297, 299; 414/30, 31,
97, 126; 312/35, 45, 72; 211/59.2, 59.4; 193/1,
2, 25 A, 32, DIG. 2

[56] References Cited

U.S. PATENT DOCUMENTS

| | | | |
|---|---|---|---|
| 2,835,409 | 5/1958 | Rankin, Jr. | 221/67 |
| 3,294,259 | 12/1966 | Puhm | 414/126 |
| 3,623,618 | 11/1971 | Shaw | 414/126 |
| 3,834,584 | 9/1974 | Stute | 221/312 R |
| 3,837,528 | 9/1974 | Rakucewicz | 221/114 |

FOREIGN PATENT DOCUMENTS

| | | | |
|---|---|---|---|
| 272273 | 4/1965 | Australia | 221/301 |
| 632070 | 11/1963 | Belgium | 211/59.2 |
| 375982 | 10/1939 | Italy | 414/126 |
| 0063624 | 4/1983 | Japan | 414/30 |

Primary Examiner—Joseph J. Rolla
Assistant Examiner—Edward S. Ammeen
Attorney, Agent, or Firm—Cort Flint

[57] ABSTRACT

Apparatus for stacking conical objects includes right hand and left hand side walls which are joined by divergent walls to define a tapering horizontal cross-section column in which the spacing between the opposite walls is shorter than the length of any one of the conical objects. The conical objects can be placed manually in the top of the column 1 but only in a given orientation (thanks to the tapering horizontal cross-section of the column) and only when hooked on a retaining finger projecting into the column through the side wall. The conical object at the top of the stack thus settles into an inclined orientation which it retains when the retaining finger is released to drop the cone down the column, thanks to an inertia brake to retard the wider diameter end of the falling cone and preventing the cone from becoming vertical. The retaining finger at the foot of the column releases only the bottom cone and allows any cones above it to become indexed downwardly into the bottom-most position.

18 Claims, 4 Drawing Sheets

APPARATUS FOR STACKING CONICAL OBJECTS

BACKGROUND OF INVENTION

The present invention relates to apparatus for stacking conical objects in such a way that the bottom conical object from the stack can be released when desired.

It has been proposed, in our co-pending British patent application No. 8612637 to provide for a set of stacks for conical objects, in order to release the conical objects onto a collecting chute at predetermined intervals for the purposes of arranging on the chute a stack of transversely extending conical objects having alternating orientation.

OBJECT OF THE INVENTION

It is an object of the invention to overcome the problem which arises of keeping the axes of the conical objects parallel so as to allow precisely timed release of the conical objects and to guard against jamming of any one of the conical objects in a stack when subjected to the weight of the other conical objects above it in the same stack.

SUMMARY OF THE INVENTION

Accordingly, the present invention provides in combination: a device for stacking conical objects and a plurality of conical objects to be stacked in said column, characterised in that said device comprises means defining a column having a tapering cross-section when viewed in plan; a plurality of conical objects to be stacked in said column, each said conical object having a length which is greater than the distance between the narrower and wider ends of the column defining means; and first retaining means in the wider end of said column for engaging the wider diameter end of a said conical object stacked in the column.

BRIEF DESCRIPTION OF THE DRAWINGS

In order that the present invention may more readily be understood the following description is given, merely by way of example, with reference to the accompanying drawings in which.

DETAILED DESCRIPTION OF THE PREFERRED EMBODIMENTS

Figure 1:
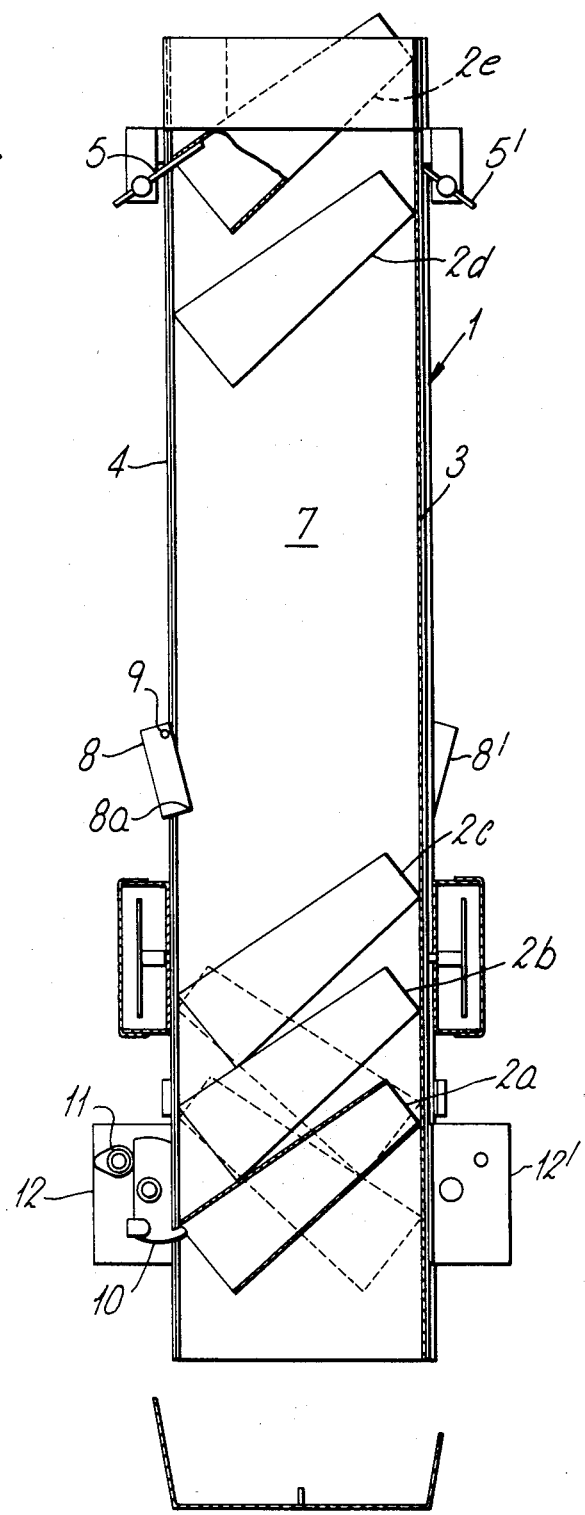
FIG. 1 is a sectional view taken on the line I—I of FIG. 2 and shows a stack of conical objects in apparatus according to the present invention.

FIG. 1 shows a vertical section through a hollow column 1 supporting a stack of conical objects 2a, 2b, 2c, 2d and 2e.

The right hand side wall 3 is spaced from the left hand side wall 4 by a distance which is less than the length of any one of the identical conical objects 2a-2e so that it is not possible for a conical object to be placed in the column 1 except when it has an inclined orientation. It will be appreciated that all references to conical objects include frusto-conical objects. At the top of the column 1 is a retaining finger 5 which engages inside the wider end of a conical object and extends sufficiently far inwardly from the left hand side wall 4 to cause the conical object 2e just being placed at the top of the stack to jam at its wider end if it were to be placed in the column with the wrong direction of inclination, i.e. with the wider end uppermost.

Figure 2:
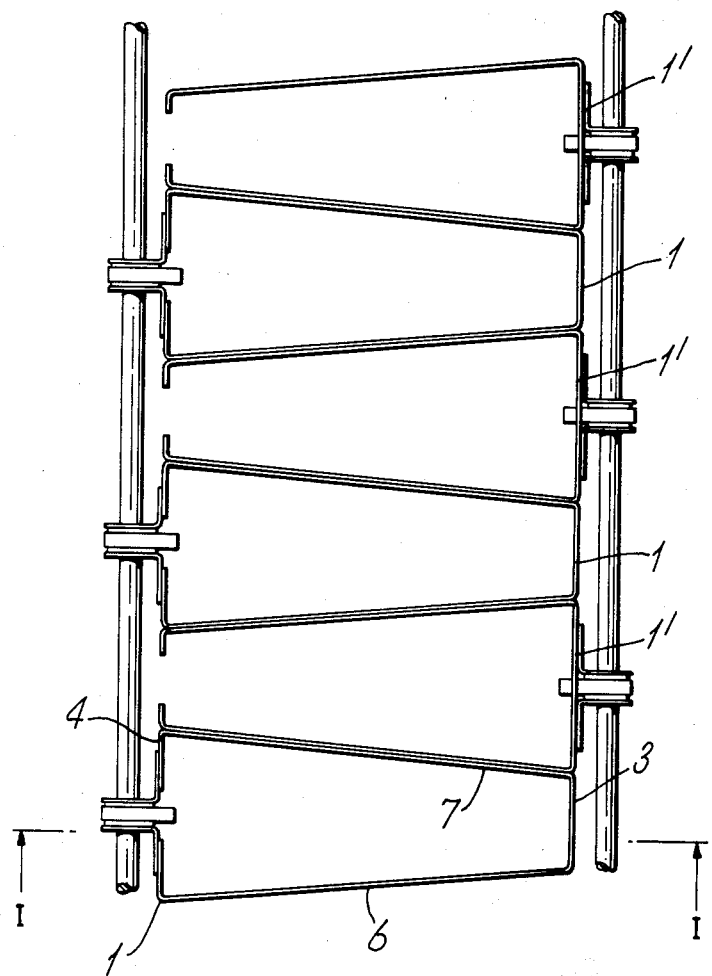
FIG. 2 is a top plan view of several stacks of the type shown in FIG. 1.

As shown in FIG. 2, column means is defined by the column 1 is completed by two divergent walls 6 and 7 joining the left hand wall 4 to the right hand wall 3. In practice the angle included between the divergent side walls 6 and 7 is slightly greater than the angle of taper or conicity of each of the conical objects 2a-2e so that the cross-section of the column 1 substantially corresponds to the vertical projection of each of the conical objects 2a-2e when held in the stack in the FIG. 1 configuration.

When it is desired to release the top conical object 2e to fall down the column to join the rest of the stack in the column, the retaining finger 5 can be rotated, for example manually by the operator, in the clockwise direction through an angle of at least 120°, thereby releasing the wider end of the upper conical object 2e. That conical object can then fall, for example through the position shown at 2d in FIG. 1, and land on the stack 2a, 2b, 2c already positioned at the bottom of the column 1. All of the fingers 5 may, if desired, be interconnected to a common actuator which operates once the various columns of the device all have a conical object held at the top by its finger 5.

In order to maintain the upwardly inclined orientation of the falling conical object 2e, a brake 8 is provided in the form of a rectangular plate freely suspended by one of its corners on a spindle 9 so that another corner 8a projects into the path of the wider end of the falling conical object 2e, and hence both slows down the falling conical object 2e and maintains its inclined orientation by preventing the falling conical object from adopting a vertical orientation at the wider end of the column 1.

If desired, the brake means may be other than an inertia brake and may, for example, be a spring brake.

At the bottom of the stack is a release cam 10 driven by an appropriate drive mechanism, for example motorised, including a drive cam 11 for releasing the wider end of the lowermost conical object 2a, when desired. When the release cam 10 pivots clockwise to release the bottom conical object 2a, the upper corner of the release cam enters the column to hold back the second conical object 2b until the release cam is returned to its FIG. 1 position.

As shown in FIG. 2, there are several adjacent columns of which alternate columns 1 have the same orientation as the column shown in FIG. 1 and the intervening columns 1' have the reversed orientation. FIG. 1 shows a mounting bracket 12' corresponding to the bracket 12 on which the release cam 10 and drive cam 11 for the column 1 are fitted, and likewise shows the brake 8' and the retaining finger 5' of the next column 1'.

The apparatus shown in FIGS. 1 and 2 is also described and claimed in our co-pending British patent application No. 8612637 the disclosure of which is incorporated herein by reference.

The divergent side walls 6 and 7 of each column need not extend continuously between the end walls 3 and 4. For example they may define only the corners of the column and may otherwise be open. The end walls 3 and 4 may similarly themselves be open.

It will of course be understood that there will be equal numbers of the alternately arranged columns 1 and 1' respectively.

Figure 3:
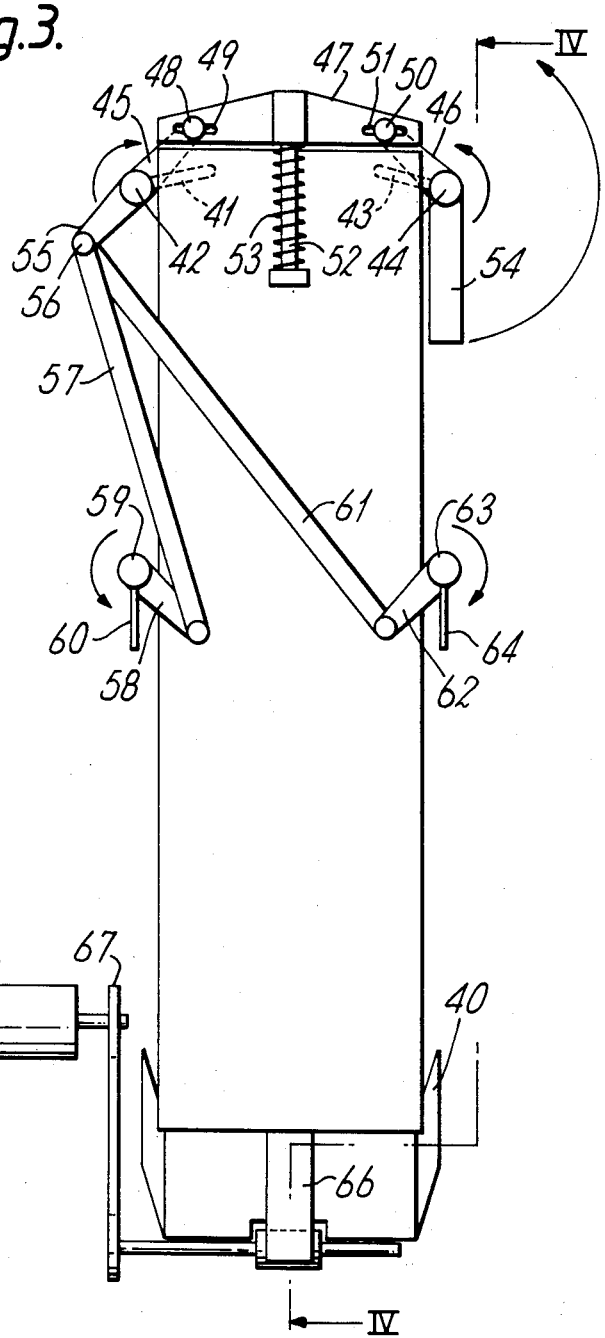
FIG. 3 is an end elevation of a second aspect of the device.
Figure 4:
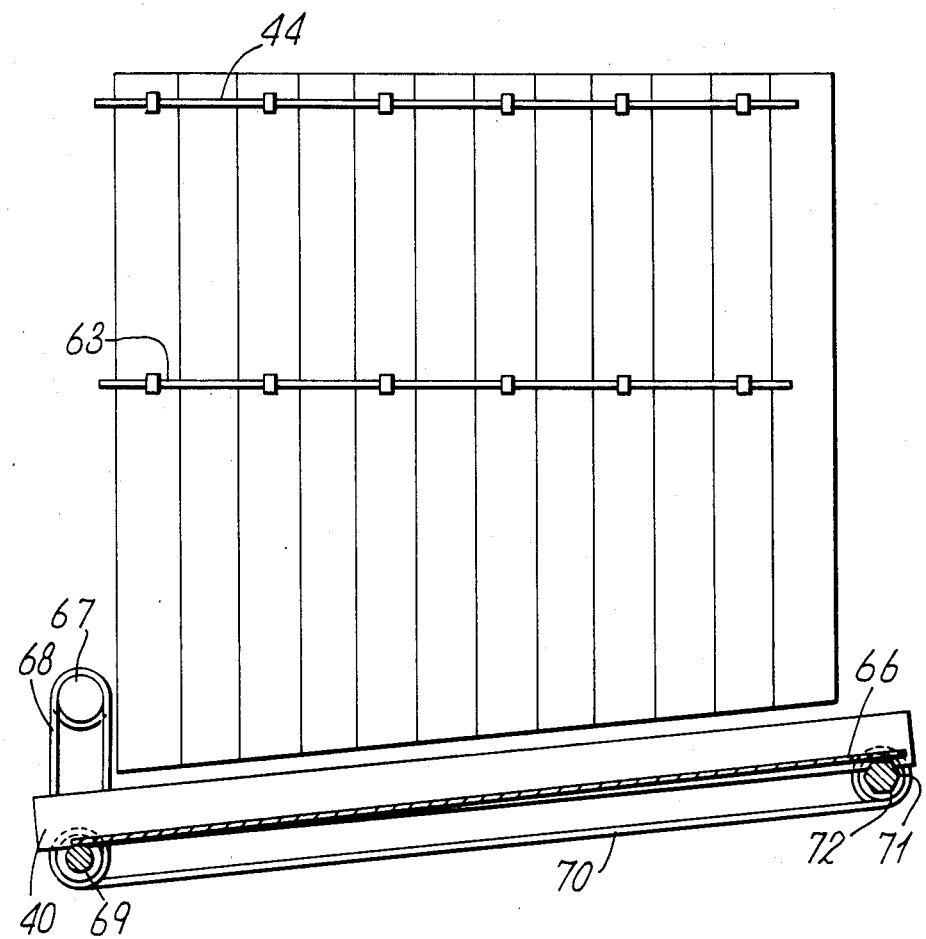
FIG. 4 is a side elevation of the device of FIG. 3 but with the lower part illustrated as a section on the line IV—IV of FIG. 3.

A second embodiment of the present invention is illustrated in FIGS. 3 and 4 in which FIG. 3 shows an end elevational, partly sectional view which illustrates drive linkage between the various cone retaining fingers corresponding to fingers 5 of FIG. 1, and additional retaining fingers which replace the brake plates 8 and 8' of FIG. 1.

The embodiment of FIGS. 3 and 4 also lacks the upstanding fin shown on the chute floor at the bottom of FIG. 1 and instead uses a joggling plate which can be better appreciated from FIG. 4.

FIG. 3 shows each of the upper retaining fingers 41 along the left hand side of the stack mounted on a common shaft 42, and each of the retaining fingers 43 at the right hand side of the stack mounted on a common shaft 44.

The shafts 42 and 44 have respective drive levers 45 and 46 joined to a cross head 47 at one end of the machine, the lever 45 of shaft 42 having a horizontally extending end 48 which rides in a horizontal slot 49 of the cross head 47 while the lever 46 of shaft 44 has a similar end portion 50 riding in a horizontal slot 51 of the cross head 47.

The cross head 47 is itself supported on a vertical bolt 52 and is biased upwardly by a helical compression spring 53. The arrangement is such that descent of the cross head 47 against the biasing of the spring 53 on the stationary bolt 52 will rotate shaft 42 in the clockwise direction and shaft 44 in the anticlockwise direction thereby retracting the various fingers 41 on shaft 42 and fingers 43 on shaft 44. This depression of the cross head 47 is achieved by means of an operating lever 54 mounted at one end of shaft 44 and able to be lifted by the operator in order to lower the various retaining fingers 41 and 43, simultaneously.

Rotation of the shaft 42 in the clockwise sense to lower its various fingers 41 will also result in anticlockwise rotation of an arm 55 at one end of the shaft 42, the arm 55 having its free end articulated at 56 to a link 57 which, through the agency of a crank 58, drives a shaft 59 for clockwise rotation to introduce its retaining fingers 60 into the respective columns of the apparatus, and the articulation 56 also effects driving to a link 61 which, through the agency of a crank 62, effects clockwise rotation of a shaft 63 to introduce its various rotating fingers 64 into the respective columns of the device.

It should be noted that when the upper retaining fingers 41 and 43 are all in their raised positions where they retain the top tube in the respective column (the FIG. 3 position), the lower retaining fingers 60 and 64 mid-way down the columns are in the retracted or lowered position where they have just released a cone retained thereon to allow it to join the other cones (not shown) at the bottom of the stack in the respective column.

It will be appreciated that the end elevation of FIG. 3 is taken from the left hand side of FIG. 4. In FIG. 3, for reasons of simplicity of illustration, the release cams 10 of FIG. 1 together with their associated drive linkage have all been omitted, and so has a stack monitoring system which is in practice provided for detecting a given state of depletion of the stack of cones 2a-2e in the column 3.

FIG. 3 also shows a drive motor 65 for a joggling plate 66 extending along the floor of the chute 40. The drive transmission to the joggling plate 66 is best illustrated in FIG. 4.

In FIG. 4, from which the linkage to the shafts 44 and 63, and the fingers on those shafts, have been omitted, there is shown the output pulley 67 of the motor 65 driving a belt 68 which also passes around a pulley 69 on a shaft at the lower end of the chute 40. A further drive belt 70 passes in a direction generally parallel to the floor of the chute 40 and around a further pulley 71 at the upper end of the chute 40. The shaft (not shown) fastened to the pulley 71 carries a hexagonal cam 72 on which the joggling bar 66 sits, the other end of the joggling bar 66 adjacent the downstream end of the chute 40 being suitably pivoted, for example by means of a loose fitting finger passing through the joggling bar 66 but anchored to the floor of the chute 40.

As will be readily appreciated, operation of the motor 65 results in rotation of the hexagonal cam 72 causing a joggling oscillation of the joggling bar 66, thereby unsticking any cones in the alternating orientation array of cones lying on the collecting surface defined by the floor of the chute 40, and hence promoting movement of those cones down the inclined chute.

I claim:

1. In combination:
   a device for stacking conical objects said device comprising:
   column means for stacking said conical objects defining at least one column with a longitudinal axis and having a tapering cross-section defined by a narrower end and a wider end when said cross-section is viewed in plan;
   a plurality of generally superposed conical objects each having a wider diameter first end, and a second end and a length, to be stacked in single stacks in said column means, said at least one column having a single said narrower end to accommodate said second ends of the objects in a single stack and a single said wider end to accommodate the wider ends of said objects in said single stack;
   said length of said conical objects being greater than a distance between said narrower end and said wider end of said column means; and
   first retaining means disposed adjacent said wider end of said column means for engaging said wider diameter end of said conical objects stacked generally superposed in said column means wherein said at least one column is adapted to be disposed adjacent at least one other column to form a row of said columns, each said column in said row being oriented such that its said wider end is adjacent said narrower end of said adjacent column, and its said narrower end is adjacent said wider end of said adjacent column.

2. Apparatus according to claim 1, wherein said first retaining means are disposed at least near the bottom of said column means, and including second retaining means thereabove at said wider end of said column means for engaging an uppermost conical object at least near the top of said column means, said second retaining means being operable to release said upper conical object when desired.

3. Apparatus according to claim 2, wherein said first retaining means includes a rockable release cam adapted to release a bottom conical object in said column means and simultaneously to retain a next adjacent conical object vertically above said bottom conical object to ensure only said bottom conical object falls from the column means at one cycle of the release cam.

4. Apparatus according to claim 3, including motorized drive means connected to said first retaining means for driving said first retaining means.

5. Apparatus according to claim 2, wherein said second retaining means is manually operable.

6. Apparatus according to claim 2, and including releasable third conical object-retaining means partway down each said column means to retain a conical object and to release it at a predetermined instant.

7. In combination: a device for stacking conical objects said device comprising:
   column means for stacking said conical objects defining a column having a tapering cross-section defined by a narrower end and a wider end when said cross-section is viewed in plan;
   a plurality of conical objects each having a wider diameter end and a length, to be stacked in said column means;
   said length of each said conical object being greater than a distance between said narrower end and said wider end of said column means; and
   first retaining means disposed adjacent said wider end of said column means for engaging said wider diameter end of said conical objects stacked in said column means and being disposed at least near the bottom of said column means, and including second retaining means thereabove at said wider end of said column means for engaging an uppermost conical object in said column means, said second retaining means being operable to release said upper conical object when desired; said first retaining means including a rockable release cam adapted to release a bottom conical object in said column means and simultaneously to retain a next adjacent conical object to ensure only said bottom conical object falls from the column means at one cycle of the release cam; and braking means carried by said column means between said first retaining means and said second retaining means to maintain an upwardly inclined orientation of a falling conical object.

8. In combination: a device for stacking conical objects said device comprising:
   column means for stacking said conical objects defining a column having a tapering cross-section defined by a narrower end and a wider end when said cross-section is viewed in plan;
   a plurality of conical objects each having a wider diameter end and a length, to be stacked in said column means;
   said length of each said conical object being greater than a distance between said narrower end and said wider end of said column means; and
   first retaining means disposed adjacent said wider end of said column means for engaging said wider diameter end of said conical objects stacked in said column means and being disposed at least near the bottom of said column means, and including second retaining means thereabove at said wider end of said column means for engaging an uppermost conical object in said column means, said second retaining means being operable to release said upper conical object when desired; and releasable third conical object-retaining means partway down said column means to retain a conical object and to release it at a predetermined instant; said second retaining means including a first retaining finger near a top of said column means to hold up a conical object placed in said top of said column means, drive means operable to drive said first retaining finger for retraction, and control means to operate said drive means to retract said finger to release said placed conical object when desired; and said third retaining means comprising a second retaining finger partway down said column means, drive means operable to drive said second retaining finger for retraction, and control means to operate said drive means to retract said second retaining finger and driven for retaining a conical object during its descent down the column means and for releasing said retained conical object.

9. In combination: a device for stacking conical objects said device comprising:
   column means for stacking said conical objects defining a column having a tapering cross-section defined by a narrower end and a wider end when said cross-section is viewed in plan;
   a plurality of conical objects each having a wider diameter end and a length, to be stacked in said column means;
   said length of each said conical object being greater than a distance between said narrower end and said wider end of said column means; and
   first retaining means disposed adjacent said wider end of said column means for engaging said wider diameter end of said conical objects stacked in said column means and being disposed at least near the bottom of said column means, and including second retaining means thereabove at said wider end of said column means for engaging an uppermost conical object in said column means, said second retaining means being operable to release said upper conical object when desired; and releasable third conical object-retaining means partway down said column means to retain a conical object and to release it at a predetermined instant; said second retaining means including a first retaining finger near a top of said column means to hold up a conical object placed in said top of said column means, drive means operable to drive said first retaining finger for retraction, and control means to operate said drive means to retract said finger to release said placed conical object when desired; and said third retaining means comprising a second retaining finger partway down said column means, drive means operable to drive said second retaining finger for retraction, and control means to operate said drive means to retract said second retaining finger and driven for retaining a conical object during its descent down the column means and for releasing said retained conical object; wherein said drive means of said first retaining finger and said drive means of said second retaining finger in said column means is a common drive means for driving said first retaining finger in said column means to a position in which it releases a conical object retained thereby while simultaneously driving said second retaining finger of said column means into a position in which it retains a descending conical object by engaging the wider diameter end thereof.

10. In combination: a device for stacking conical objects said device comprising:
    column means for stacking said conical objects defining a column having a tapering cross-section defining a narrower end and a wider end when said cross-section is viewed in plan;

a plurality of conical objects each having a wider diameter end and a length, to be stacked in said column means;

said length of said conical objects being greater than a distance between said narrower end and said wider end of said column means; and retaining means disposed adjacent said wider end of said column means for engaging said wider diameter end of said conical objects stacked in said column means;

wherein said column means further includes divergent side walls having an angle of taper therebetween joining said narrower end and said wider end of said column means, said angle of taper being greater than an angle of taper of said conical objects.

11. In combination: a device for stacking conical objects said device comprising:

column means for stacking said conical objects defining a column with a longitudinal axis and having a tapering cross-section defined by a narrower end and a wider end when said cross-section is viewed in plan;

a plurality of conical objects each having a wider diameter end and a length, to be stacked in said column means;

said length of said conical objects being greater than a distance between said narrower end and said wider end of said column means; and retaining means disposed adjacent said wider end of said column means for engaging said wider diameter end of said conical objects stacked in said column means;

wherein said column means further includes divergent side walls having an angle of taper therebetween joining said narrower end and said wider end of said column means, said angle of taper being greater than an angle of taper of said conical objects;

wherein said conical objects are shaped to rest, when stacked in said column means, between said narrower end and said wider end of said column means at a range of possible angles of inclination with respect to a normal to said longitudinal axis, said range having a minimum said angle of inclination which is greater than zero degree; and wherein the angle of divergence of said side walls of said column means is in substantial conformity with a vertical projection, onto the horizontal, of said inclined conical object in position at said minimum angle of inclination.

12. In combination: a device for stacking conical objects said device comprising:

column means for stacking said conical objects defining a column having a tapering cross-section defining a narrower end and a wider end when said cross-section is viewed in plan;

a plurality of conical objects each having a wider diameter end and a length, to be stacked in said column means;

said length of said conical objects being greater than a distance between said narrower end and said wider end of said column means; and first retaining means disposed adjacent said wider end of said column means for engaging said wider diameter end of said conical objects stacked in said column means, wherein said first retaining means are disposed at least near the bottom of said column means;

second retaining means above said first retaining means at said wider end of said column means for engaging an uppermost conical object at least near the top of said column means, said second retaining means being operable to release said upper conical object when desired; and releasable third conical object-retaining means partway down said column means to retain a conical object and to release it at a predetermined instant;

wherein said second retaining means includes a first retaining finger near a top of said column means to hold up a conical object placed in said top of said column means, drive means operable to drive said first retaining finger for retraction, and control means to operate said drive means to retract said finger to release said placed conical object when desired.

13. A device for stacking conical objects comprising:

column means for stacking conical objects defining at least one generally enclosed vertical column having a tapering cross-section defined by a narrower end and a wider end when said cross-section is viewed in plan; said column means being adapted for receiving a plurality of generally superposed conical objects each having a wider diameter end, a narrower end and a length, to be stacked in a single stack in said at least one column, said at least one column having a single said narrower end to its tapering cross-section to accommodate the narrower ends of the objects in a single stack and a single said wider end to accommodate the wider ends of said objects in said single stack;

a distance between said narrower end and said wider end of said column means being less than said length of said conical objects; and first retaining means disposed adjacent said wider end of said column means for engaging said wider diameter end of conical objects stacked generally superposed in said column means;

wherein said at least one column is adapted to be disposed adjacent at least one other column to form a row of said columns; each said column in said row being oriented such that its said wider end is adjacent said narrower end of said adjacent column, and its said narrower end is adjacent said wider end of said adjacent column.

14. Apparatus according to claim 13, wherein said column means further includes divergent side walls having an angle of taper therebetween joining said narrower end and said wider end of said column means, said angle of taper being greater than an angle of taper of said conical objects.

15. Apparatus according to claim 13 wherein said conical objects are shaped to rest, when stacked in said column means, between said narrower end and said wider end of said column means at a shallowest angle of inclination with respect to the horizontal; and wherein an angle of divergence of side walls of said column means is in substantial conformity with a vertical projection, onto the horizontal, of an inclined conical object in position at the shallowest angle of inclination.

16. Apparatus according to claim 15, wherein said first retaining means is disposed at least near the bottom of said column means, and including second retaining means thereabove at said wider end of said column means for engaging an uppermost conical object in said column means, said second retaining means being operable to release said upper conical object when desired.

17. Apparatus according to claim 16, wherein said first retaining means includes a rockable release cam adapted to release a bottom conical object in said column means and simultaneously to retain a next adjacent conical object to ensure only said bottom conical object falls from the column means at one cycle of the release cam.

18. Apparatus according to claim 17, including motorized drive means connected to said first retaining means for driving said first retaining means.

* * * * *